March 22, 1960 A. C. JACOBAEUS ET AL 2,929,879

MULTI-CHANNEL PULSE COMMUNICATION SYSTEM

Filed Feb. 23, 1955 7 Sheets-Sheet 1

INVENTORS
A. C. JACOBAEUS
O. G. JONASON
W. E. W. JACOB
BY [signature]
ATTORNEY

INVENTORS
A. C. JACOBAEUS
O. G. JONASON
W. E. W. JACOB
BY Fredrik E. Hane
ATTORNEY March 22, 1960 A. C. JACOBAEUS ET AL 2,929,879

MULTI-CHANNEL PULSE COMMUNICATION SYSTEM

Filed Feb. 23, 1955 7 Sheets-Sheet 3

INVENTORS
A. C. JACOBAEUS
O. G. JONASON
W. E. W. JACOB
BY [signature]
ATTORNEY

INVENTORS
A. C. JACOBAEUS
O. G. JONASON
W. E. W. JACOB
BY [signature]
ATTORNEY

March 22, 1960 A. C. JACOBAEUS ET AL 2,929,879

MULTI-CHANNEL PULSE COMMUNICATION SYSTEM

Filed Feb. 23, 1955 7 Sheets-Sheet 5

INVENTORS
A. C. JACOBAEUS
O. G. JONASON
W. E. W. JACOB
BY [signature]
ATTORNEY

INVENTORS
A.C. JACOBAEUS
O.G. JONASON
W.E.W. JACOB
BY [signature]
ATTORNEY

INVENTORS
A. C JACOBAEUS
O. G. JONASON
W. E. W. JACOB
BY [signature]
ATTORNEY 2,929,879

MULTI-CHANNEL PULSE COMMUNICATION SYSTEM

Anton Christian Jacobaeus, Stockholm, and Olof Gunnar Jonason and Walter Emil Wilhelm Jacob, Hagersten, Sweden, assignors to Telefonaktiebolaget L M Ericsson, Stockholm, Sweden, a corporation of Sweden Application February 23, 1955, Serial No. 490,062

Claims priority, application Sweden March 9, 1954

3 Claims. (Cl. 179—15)

The present invention refers to multi-channel pulse communication systems, especially electronic automatic telephony systems in which connections are set up between calling and called lines and the lines, which take part in communications are periodically connected to a common point by means of line gates in such a manner that the communication signals of the separate connections are fed to the common point in the shape of modulated pulses which are mutually displaced in time.

The electronic automatic telephony systems as heretofore known, are usually four-wire-systems, i.e. there have been completely separate signal paths for incoming and outgoing signals to and from a subscriber. This entails that certain means in each subscriber's equipment, for example the required gates, must be doubled which makes such a system uneconomical. It has also been tried to produce two-wire-systems including certain balanced circuits, but such systems remain unstable and entail cross-talk. According to the present invention a two-wire-system with good transmission quality can be obtained by each connection being allotted four pulse positions within a repetition period, and the invention is characterized by an amplifying device connected to a common point and common to all the connections, comprising an input gate, at least one amplifier connected in cascade with a delay line and an output gate, means to actuate the subscriber's line gates and said in- and output gates in such a manner that for each connection the calling subscriber's line gate and said input gate are opened during a first pulse position, the called subscriber's line gate and said output gate are opened during a second pulse position, the called subscriber's line gate and said input gate are opened during a third pulse position, and the calling subscriber's line gate and said output gate are opened during a fourth pulse position, the time interval between said first and second and respectively said third and fourth pulse positions being equal to the delay time of the delay line.

If the delay time is made equal to half the repetition period plus one pulse position, the two-pulse positions during which a special line gate, for example that of the calling subscriber is open, will fall in immediate proximity of each other and therefore each line gate need to be opened only once during each repetition period. This affords the advantage that the line gates need be dimensioned only for half the frequency which would otherwise be required and can thus be made simpler without any risk of cross-talk or the like.

It is true that said in- and output gates must be dimensioned for a quicker gate frequency, since they must be opened twice for each communication per repetition period, but there are only two such gates.

The invention will be described more in detail in connection with the accompanying drawings, of which Fig. 1 shows a block diagram of a system according to the invention, Fig. 2 shows the subscriber's equipment.

Fig. 7 shows how Figs. 2–6 are to be assembled.

Figure 1:
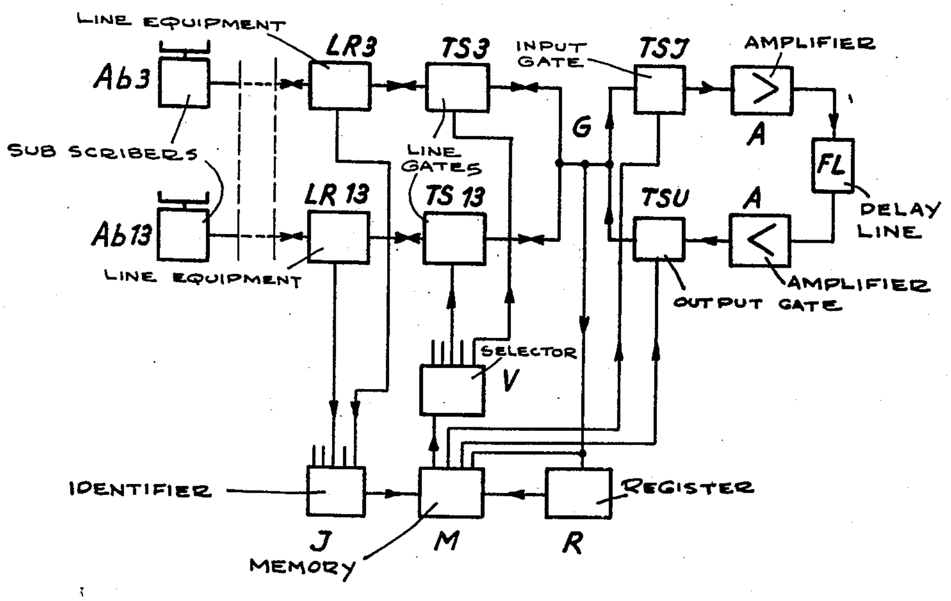

In Fig. 1, which shows a block diagram of the system according to the invention, A*b*3 and A*b*13 are two subscribers with the references 3 and 13, respectively. Said subscribers are provided with the equipments LR3 and LR13, respectively, and line gates TS3 and TS13, respectively. M is a memory in which are stored the designations of the calling and called subscribers of a number of simultaneous communication channels, said memory being arranged to read said designations periodically and reproduce them in the shape of pulse combinations. I is an identifier for identifying a calling subscriber's designation and transforming it into a code suitable for storing in the memory M. R is a register in which the called subscriber's designation is stored during dialling and transformed into the corresponding code before being recorded in the memory M. V is a selecting device arranged to actuate the line gates TS in dependence on the impulses obtained from the memory M. TSU and TSI which are connected to the point G common to all the subscribers, are the output and the input gates, respectively, to the circuit consisting of the amplifiers A and the delay link FL.

The device operates generally in the following manner: When a subscriber for example A*b*3, initiates a call, the line relay circuit LR3 is operated and the identifier I starts and identifies the calling subscriber's designation, and transforms it into for example, a binary code. Said code is recorded in the memory M which is arranged to store the designations of the calling and the called subscribers of all the simultaneous connections. The different designations are cyclically read, one after the other, thereby causing the selector device V which is operated in accordance with the read designations to send gate pulses to the corresponding gates TS. As soon as the calling subscriber's designation, i.e. 0011 in a binary code, has been recorded in the memory M, gate pulses and sent to the gate TS3 and the calling subscriber is connected to the register R. He receives dialling tone from the register and can start dialling. The called subscriber's designation, for example 13, is stored in the register in the shape of a binary code until the dialling is completed, whereafter it is recorded in the memory. As soon as the recording has been effected the selecting device V starts sending gate impulses to the called subscriber's gate, and the communication is set up. A call signal is transferred to the called subscriber by his line equipment LR13 being operated as soon as the gate TS13 is opened for the channel pulses from the calling subscriber. When the called subscriber has answered, the communication is set up. During the call the gates TSU and TSI are actuated in such a manner that during the time during which a line gate TS is open, TSU and TSI are each open half that time. Supposing that the line gate TS3 is open, TSI is opened first, a talking pulse outgoing from the calling subscribed thereby being fed onto the delay link FL. During the latter part of the time, during which the line gate TS3 is open, the gate TSI is closed whereas the gate TSU is opened, the pulse outgoing from the called subscriber thereby being allowed to pass onto the calling subscriber, said last mentioned pulse having been fed onto the delay line the latest previous time the line gate TS13 and the gate TS1 were open.

When the line gate TS13 is opened after a certain time, the gate TSI will in the same manner be opened during the first half of the time during which the line gate TS13 is open, a pulse outgoing from the called subscriber thereby being fed onto the delay link FL. During the latter part of the time during which the line gate TS13 is open, the gate TSI is closed, whereas the gate TSU is opened, the pulse which was fed onto the delay link FL from the calling subscriber when the line gate TS3 and the gate TSI were open, thereby being allowed to pass onto the called subscriber. The memory M also comprises devices for controlling the communications, so that the designations stored in the memory are erased when a communication is finished, the selecting device V thereby ceasing to actuate the line gates pertaining to the connection.

In the following an embodiment of the invention will be described in detail with reference to the Figs. 2–9. The invention is naturally not limited to said embodiment, but a large number of modifications may be possible.

Figures 2, 7:
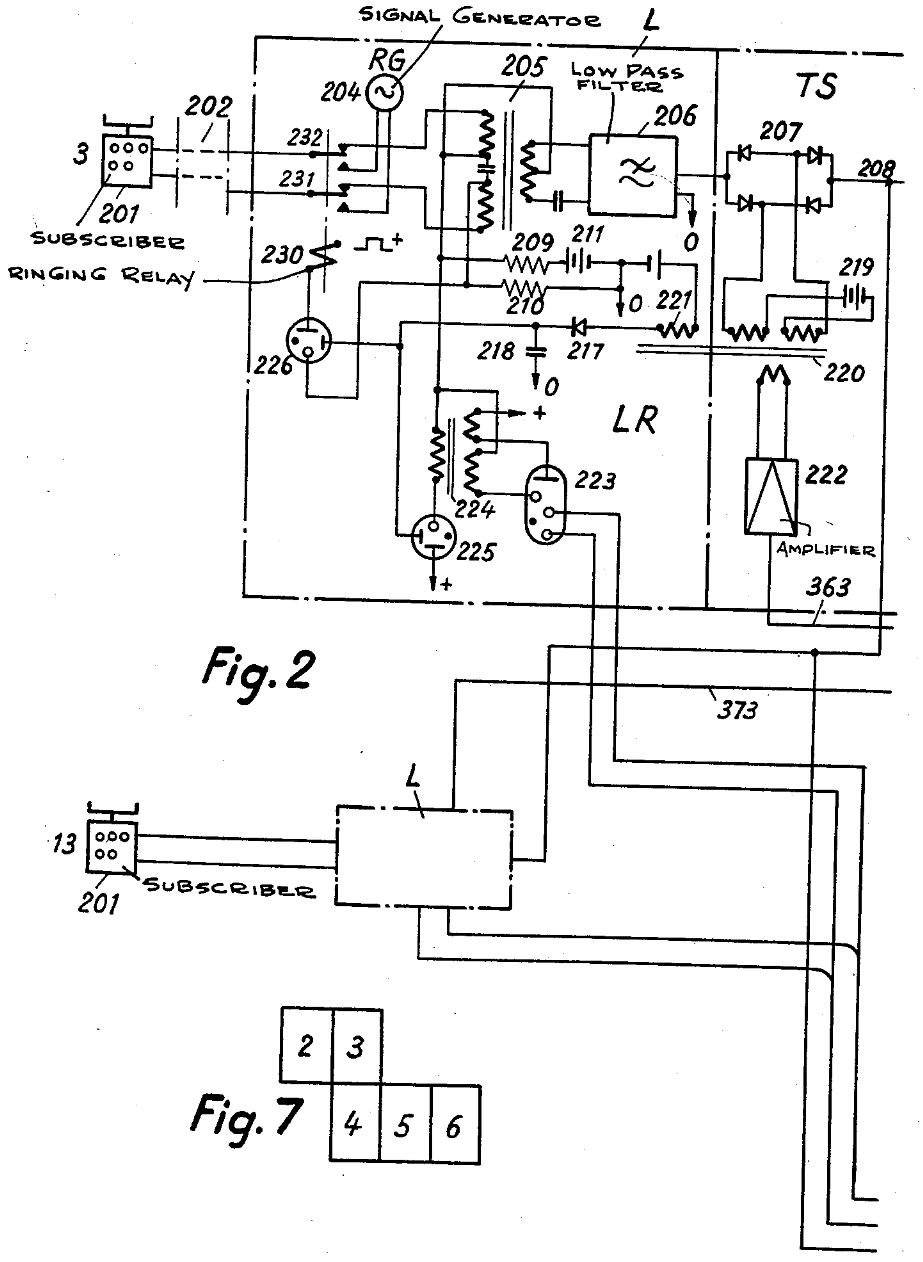

In Fig. 2 two subscribers' instruments 201 and the line equipments L individual for each subscriber are shown, one of said equipments having only been schematically indicated. The line equipment, which comprises the line relay means LR and the line gate TS, chiefly consists of a line transformer 205, a low pass filter 206, a rectifier bridge 207 connected between the subscriber and the point 208 common to all the subscribers, a pulse transformer 220, a gas discharge tube 223 for the line relay function, a gas discharge tube 225 for the break relay function, a ringing relay 230 controlled by a gas discharge tube 226 for connecting a source 204 of call signals to the subscriber's line.

Figure 3:
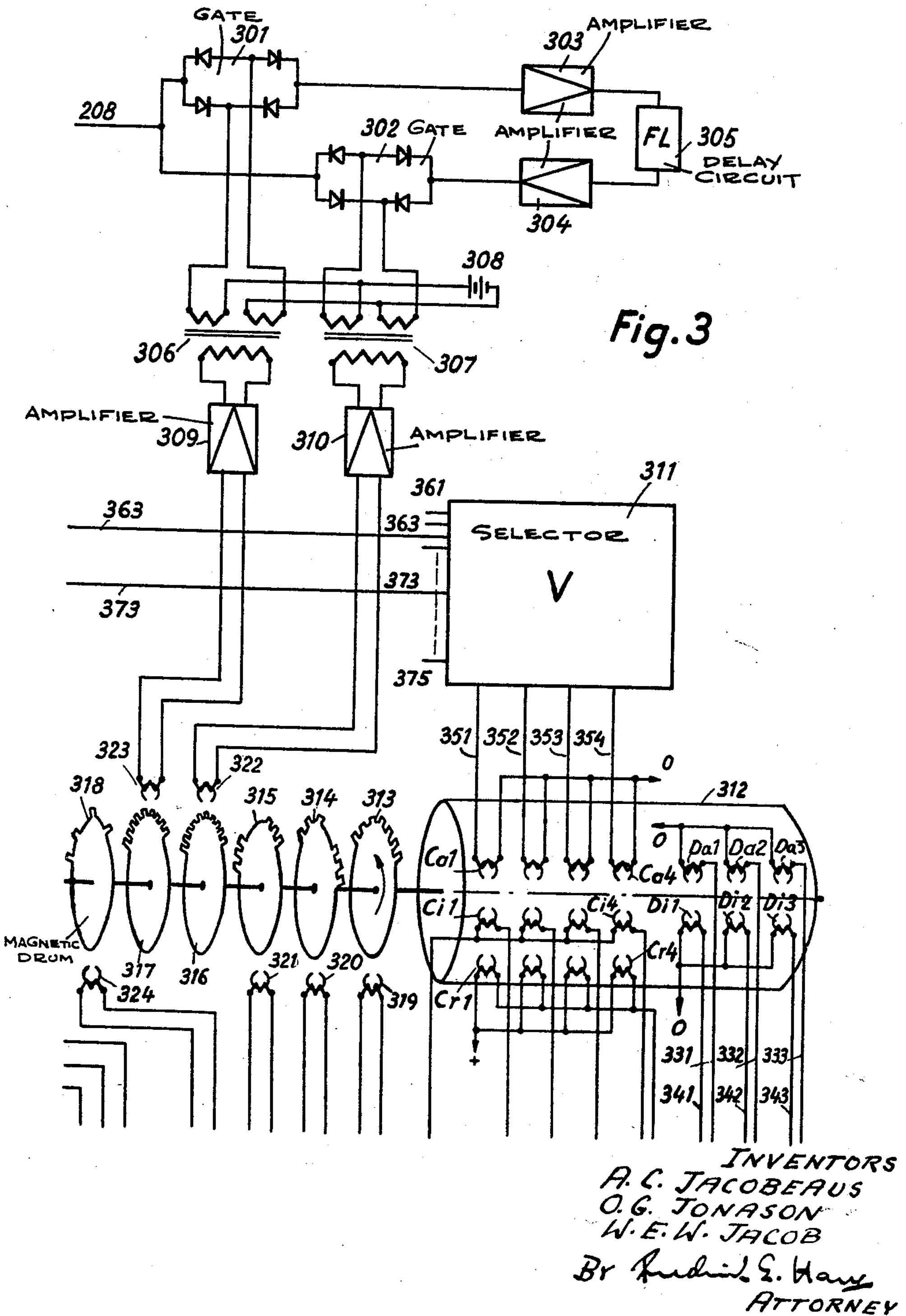
Fig. 3 shows the amplifying equipment common to the communication channels and a magnetic memory.

Fig. 3 shows the amplifying means common to all the subscribers, the rotating magnetic memory comprised in the memory M and the selecting device V. The amplifying means comprises an input gate 301, two amplifiers 303, 304, a delay link 305, an output gate 302 and transformers 306, 307 for feeding the control pulses to the gates 301, 302. The delay link may consist of a delay circuit consisting of inductances and capacitances or of electro-acoustic delay means, for example quartz rods or mercury staples, in which acoustic waves are propagating. The magnetic memory comprises a drum 312 the surface of which is covered with a magnetic material, and a number of tooth wheels 313, 314, 315, 316, 317 and 318 located on the same shaft as the drum. The drum is provided with a number of magnetic heads, of which C*i*1–C*i*4 are intended for recording the calling and the called subscriber's designations in a binary code, C*a*1–C*a*4 are intended for reproducing the information stored in the surface of the drum regarding the calling and the called subscribers and C*r*1–C*r*4 are intended for erasing said information as soon as the communication is finished. The object of the recording and erasing heads D*i*1–D*i*3 and of the reproducing heads D*a*1–D*a*3 is to produce free and busy marking, respectively, of the different axial strips on the surface of the drum, which are intended for recording information about the different simultaneous communications. In the described embodiment the subscriber's designation may comprise 4 binary digits, i.e. it is possible to connect at the most 16 subscribers, and it is possible to have at the most 3 simultaneous connections. The tooth wheels 313–318 also are provided with reproducing heads 319, 320, 321, 322, 323 and 324, which send a pulse each time a tooth passes the head.

Figure 4:
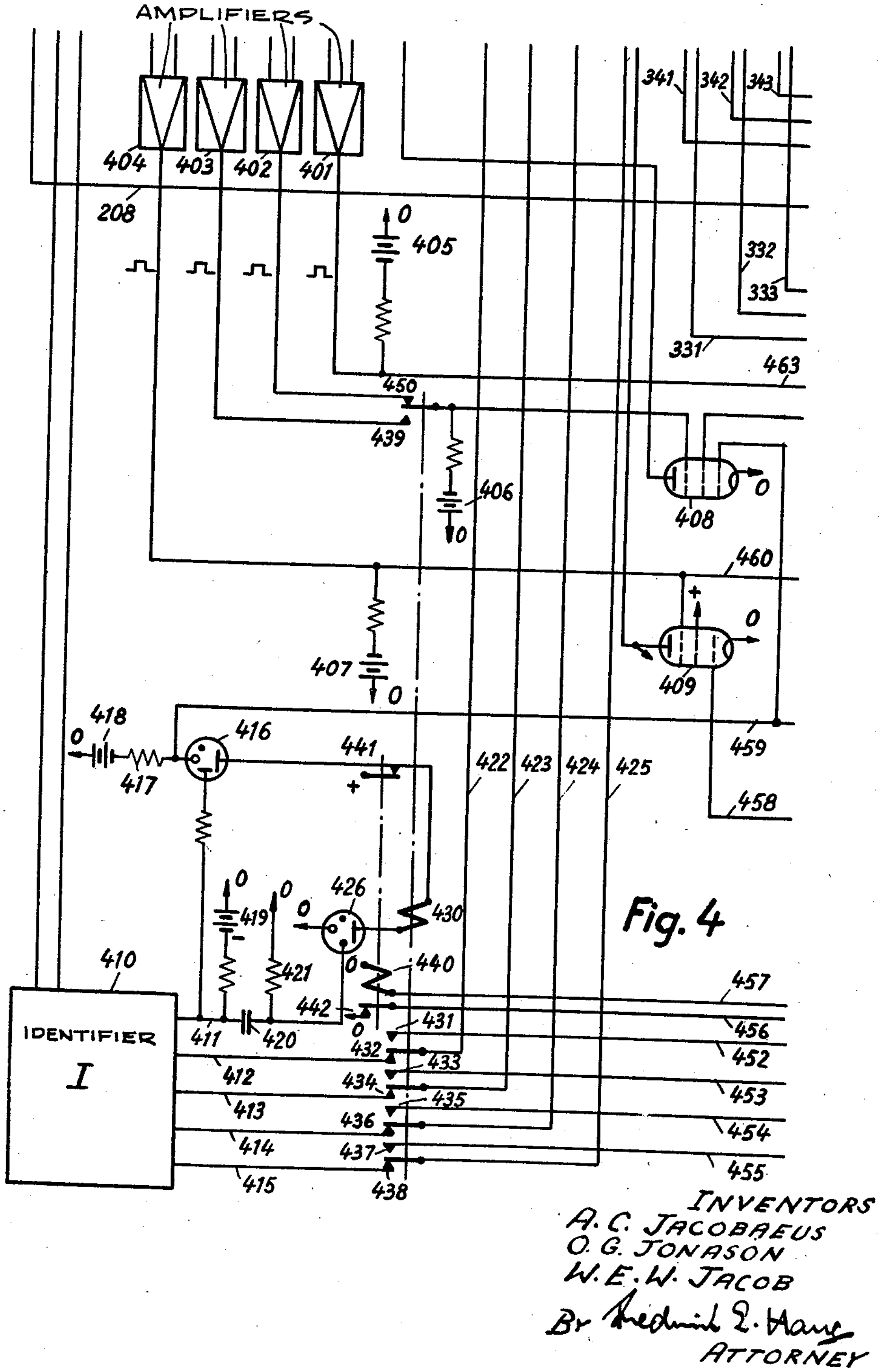
Figs. 4 and 5 show devices for recording and erasing the subscribers' designations in the magnetic memory.
Figure 5:
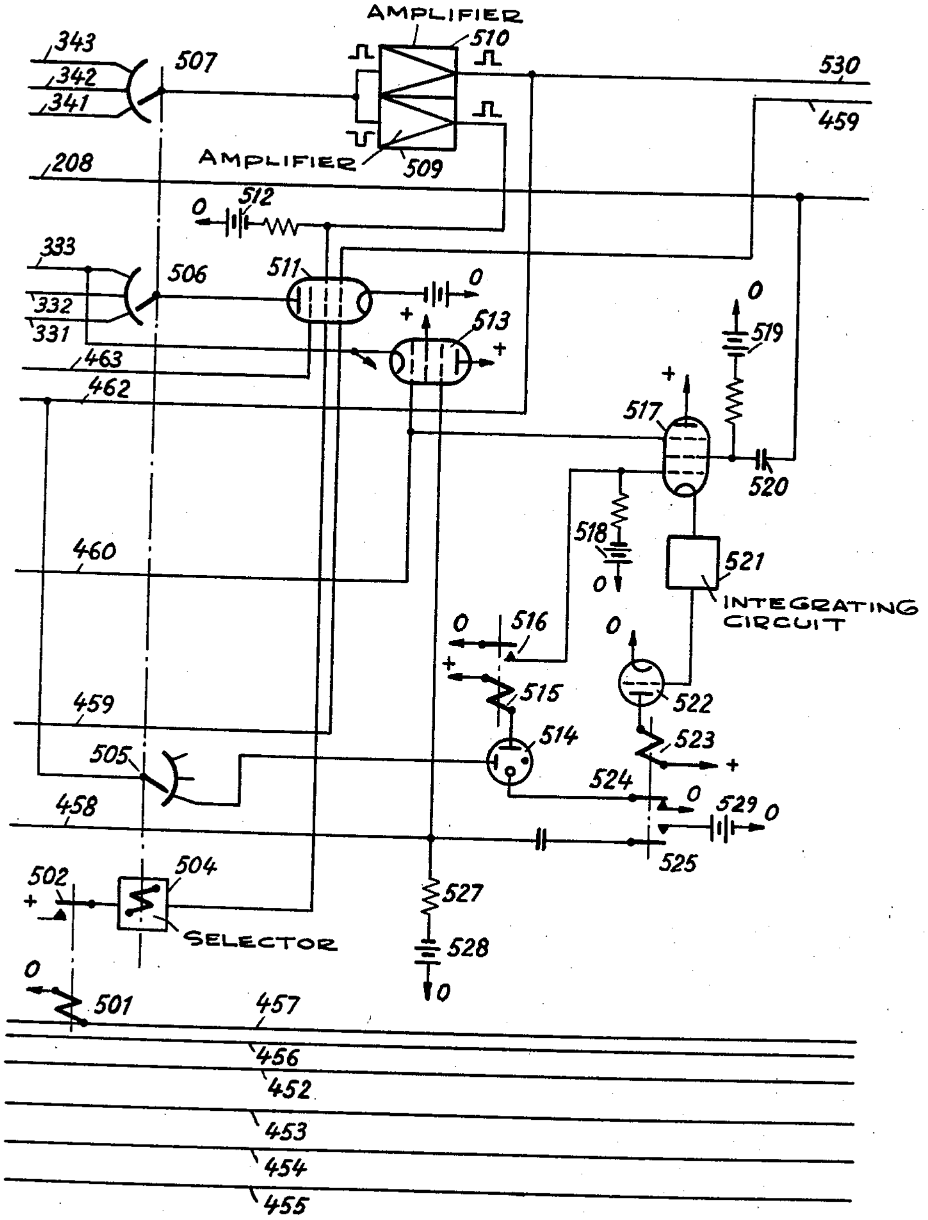

Figs. 4 and 5 show the devices controlling the recording and reproducing of the subscribers' designations on the surface of the drum 312. In Fig. 4, 410 is an identifier which identifies a calling subscriber's designation and transforms it into a binary code, 401, 402, 403 and 404 are amplifiers which amplify and shape the pulses obtained from the reproducing heads 319, 320, 321 and 324, respectively, 416 is a gas discharge tube indicating a completed identification, 426 is a gas discharge tube which, together with a relay 430, effects a switching of the recording heads from the identifier to the register as soon as the binary designation of the calling subscriber has been recorded on the magnetic drum 312. 408 is an electron tube with three control grids which controls the recording of the subscribers' designations so that they are inserted at those places of the surface of the drum which are allotted to the connection in question. 409 are electron tubes controlling the erasing of the recorded designations when the communication is finished; there is one tube for each possible communication channel, only one tube being shown on the drawing.

In Fig. 5, 504 is a three-pole selector with one position for each possible communication channel, 509 and 510 are amplifiers for amplification and shaping of the pulses obtained from the reproducing heads D*a*1–D*a*3, 511 is an electron tube for controlling the recording of information by means of the recording heads D*i*1–D*i*3, and 513 is an electron tube for controlling the erasing by means of the heads D*i*1–D*i*3. There is one electron tube 513 for each recording and erasing head D*i*1–D*i*3. The electron tubes 517 and 522, the gas discharge tube 514 and the relays 515 and 523 are comprised in an equipment for controlling and disconnecting the calls. There is such an equipment for each communication channel, but on the drawing one of them only is shown.

Figure 6:
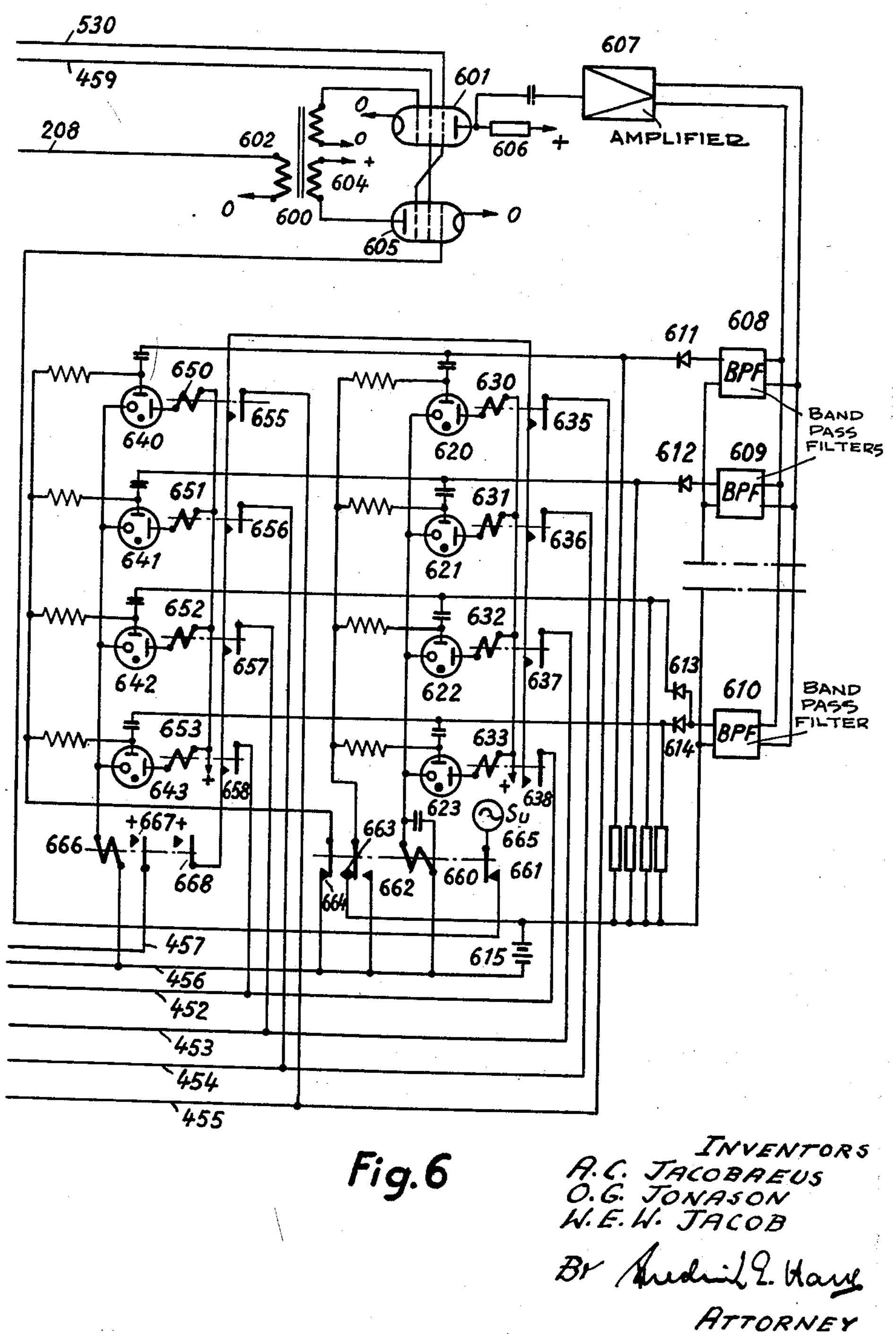
Fig. 6 shows a register.

Fig. 6 shows a register for the dialing impulses emitted from the calling subscriber and consisting of tone frequency impulses of different frequencies. In the register the dialing impulses are transformed into binary code signals which are thereafter recorded in the magnetic drum of the memory. In Fig. 6, 600 is a transformer, 601 an electron tube for controlling the supply of pulses to the register, 608, 609, 610 band pass filters for filtering the transmitted tone frequency impulses, 620, 621, 622, and 623 as well as 640, 641, 642 and 643 are gas discharge tubes for recording the transmitted impulses for the first and the second digit, respectively, 660 and 666 are relays for indicating that the first and the second digit, respectively, of the subscriber's designation, has been received, and 605 is an electron tube for controlling the transmission of the dialling tone from the buzzer 665.

Figure 8:
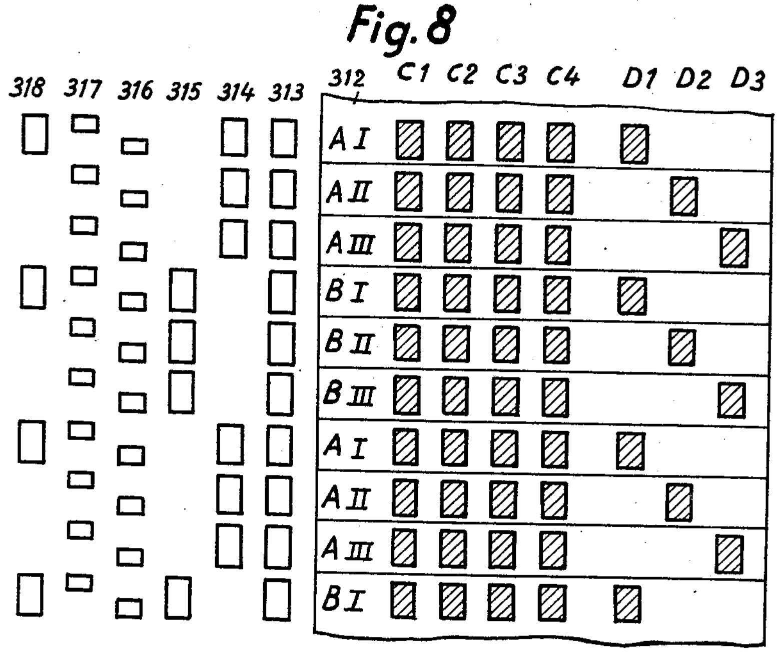
Fig. 8 shows a plan view of the surface of the magnetic memory.

Fig. 8 shows an enlargement of the periphery of the magnetic drum and the tooth wheel 313–318. Since the line gates must open about 8000 times per second in order to allow the normal voice frequency range to be transmitted, the information regarding the different communications must be recorded at a great number of areas round the surface of the drum to keep its rotation speed down to practically realisable values. That part of the periphery which represents one repetition period T is divided into six different strips. In the first three strips AI, AII, AIII, the calling subscribers' binary designations are recorded in the grooves C1, C2, C3, and C4, which are formed by the corresponding recording, reproducing and erasing heads during the rotation of the drum. In the last three strips BI, BII, BIII, the called subscribers' binary designations are recorded in the same manner. In the grooves DI, D2, D3 are recorded the information whether the said strip is free or busy, which takes place by magnetisation in different directions. All the areas, which are magnetized, are shaded in the figure.

The tooth wheel 313 is provided with a tooth for each strip on the drum, and the teeth have such a width that the pulses obtained from said wheel are as long as those obtained from the reproducing heads C*a*1–C*a*4, and D*a*1–D*a*3. The tooth wheel 314 has a tooth for each one of the strips AI–AIII, whereas the tooth wheel 315 has one tooth for each one of the strips BI–BIII. The teeth on said two wheels are so wide that the obtained pulses are as long as the pulses from the reproducing heads C*a*1–C*a*4 and D*a*1–D*a*3. The tooth wheels 316 and 317 each have one tooth for each strip and the teeth on said wheels are out of phase a half strip relatively each other. The width of said teeth is such that the pulses obtained from them are only half as long as the pulses from the reproducing heads *Ca*1–*Ca*4. The tooth wheels 318 of which there are three different ones, are provided with one tooth for each strip pertaining to a certain communication channel. The wheel shown in the figure is thus provided with one tooth for each one of the strips AI and BI.

Figure 9:
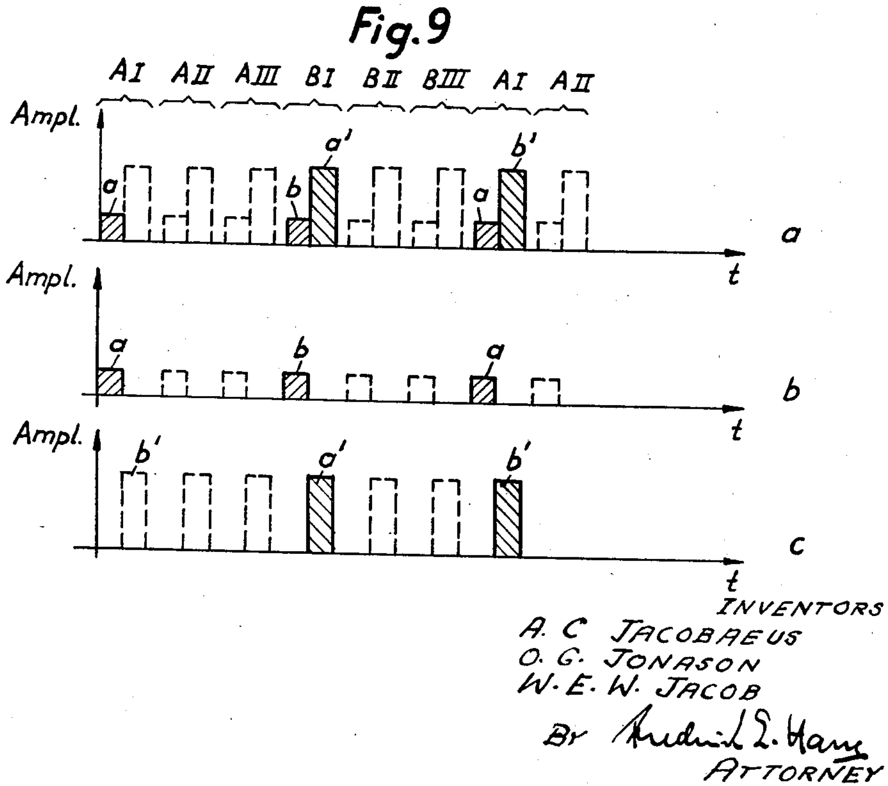
Fig. 9 shows the shape and time position of the signal pulses in different parts of the system.

Fig. 9 shows the pulses arising at different points of the system, whereby it is supposed that only one communication channel is busy, i.e. the one which uses the strips AI and BI for recording the partaking subscriber's designation. Fig. 9*a* shows pulses arising at the point common to all the subscribers, Fig. 9*b* shows the pulses after the gate 301, and Fig. 9*c* shows the pulses at the output of the amplifier 304. *a* and *b* are the pulses sent by the calling and the called subscribers, respectively, and *a'* and *b'* are the same pulses after delay and amplification in the delay link 305 and the amplifiers 303, 304. The pulses obtained from the other communication channels have been indicated in the figure with dotted outlines.

In order to describe more accurately the function of the shown system we are below going to follow more in detail the setting up, the keeping and the disconnection of a communication.

When the calling subscriber 3, who in the following is called the A-subscriber, calls, a circuit is closed from the battery 211 through the line resistances 209 and 210 and the subscriber's line 202. The voltage drop over the resistance 209 reduces the potential on the auxiliary cathode in the gas discharge tube 223 so much that the ignition gap is ionized. The gas discharge tube 225 the cathode voltage of which is equally reduced, cannot fire since the voltage over the ignition gap is not sufficiently high. The main gaps in the gas discharge tube 223 now fire sequentially, the identifier 410 thereby registering the calling subscriber's designation 3 and transforming it into the corresponding binary code 0011, which appears as a positive voltage or no-voltage on the lines 412–415. As soon as the identification is made, a positive potential is applied onto the line 411, the gas discharge tube 416 thereby firing. Through the voltage drop in the cathode resistance 417, the potential on the line 459 is increased above the cut off voltage of the grid in the electron tubes 408, 511 and 601. Supposing that the channel I is free and that the selector 504 has the position shown on the drawing, negative pulses are obtained from the reproducing head *Da*1 over the contact bank 507. These pulses are amplified and obtain reverse polarities in the amplifier 509 and are fed to a second control grid in the tube 511. Pulses from the reproducing head 319 on the tooth wheel 313 are fed to a third control grid in the tube 511.

All the surface elements passing below the recording head *Di*1 and located in the strips AI and BI will now be magnetized again so that positive pulses are obtained from the corresponding reproducing head *Da*1 when the drum has rotated one revolution. As soon as this has taken place the tube 511 is blocked, whereas the electron tube 408 is energized each time pulses are obtained simultaneously from the tooth wheel 314 through the amplifier 402 and from the reproducing head *Da*1 through the amplifier 510. The binary voltage code for the calling subscriber's designation on the wires 412, 413, 414 and 415 is recorded on the strips of the drum 312, which are called AI in Fig. 8. Since the calling subscriber's designation was 3, only the recording heads *Ci*3 and *Ci*4 will be active for re-magnetizing. As soon as all the areas about the periphery of the drum, marked with AI, have been magnetized according to the code on the wires 412–415, the reproducing heads *Da*1–*Da*4 start sending the corresponding pulse code to the selecting device 311. The structure of said device appears from Proceedings of the Institute of Radio Engineers, February 1945, page 139, and will not be described more closely here. Each binary pulse combination on the input conductors 351–354 cause a pulse to be obtained on one of the output conductors 361–375, and the maximal number of output conductors is equal to $2^n$, $n$ being equal to the number of input conductors, i.e. the number of digits in the binary code. One of the binary combinations, i.e. 0 0 0 0, is not used, since that combination indicates a free channel. Each time the strip AI passes the reproducing heads a pulse is thus obtained on the line 363, which, over the amplifier 222, is connected to the pulse transformer 220 in the A-subscriber's line gate TS. The rectifier bridge 207 is opened, the pulses then being sent to the common line 208. Across the winding 221 of the pulse transformer 220 pulses are likewise obtained, which are integrated by the integrating circuit 217, 218. The increased voltage over the condenser 218 causes the gas discharge tube 225 to fire. When the main gap of said tube fires, a current impulse is induced in the transformer 224 which extinguishes the gas discharge tube 223. The identifier 410 is thereby disconnected, and the voltages on the lines 411, 414 and 415 are reduced to zero. The voltage reduction on line 411 causes the potential on the ignition cathode in the gas discharge tube 426 to be temporarily reduced by the discharge of the condenser 420, owing to which the tube fires. Relay 430 attracts, whereby the contacts 432, 434, 436, 438 and 450 are broken and the contacts 431, 433, 435, 437 and 439 are closed. The conductors 422–425 are switched from the output conductors 412–415 of the identifier to the output conductors 452–455 of the register, and the third grid in the electron tube 408 is switched from the amplifier 402 for pulses from the tooth wheel 314 to the head 320.

As soon as the A-subscriber's line gate 207 starts opening, the subscriber receives a dialling tone from the register. From the buzzer 665 a dialling tone signal is fed to the grid of the electron tube 605, which periodically opens in accordance with the pulses from the reproducing head *Da*1 over the amplifier 510, if the gas discharge tube 416 fires. The pulses obtained in the winding 602 of the transformer 600 are thus modulated with the dialling tone frequency. The pulses arising during the first half of the pulse time BI are fed over the gate 301 to the amplifier 303, are delayed in the delay circuit 305 one half repetition period plus half the pulse position AI, and—after amplification in the amplifier 304—pass through the gate 302, the common conductor 208 and the A-subscriber's line gate 207. The pulses are demodulated in the low pass filter 206 and the obtained dialling tone is transmitted to the A-subscriber over the transformer 205 and the subscriber's line 202.

The A-subscriber now dials the desired designation 13 of the called subscriber who in the following is called the B-subscriber. The dialling impulses from the A-subscriber are sent in the shape of different audiofrequencies, which modulate the pulses sent from the gate 207. During the first half of the pulse positions AI the gate 301 is opened and the audio frequency modulated pulses pass the amplifiers 303, 304 and the delay link 305 and, during the latter part of the pulse positions BI, they are let out onto the common conductor 208 and pass the tube 601. The modulated pulses are demodulated in the band pass filter 610, which is tuned to the frequency emitted by the A-subscriber and the obtained audio frequency impulse is rectified by the rectifiers 613 and 614 and applied to the ignition electrodes on the gas discharge tubes 622 and 623, which fire. The relay 632 and 633 attract and connect the conductors 452 and 453 over the contacts 637, 638 to one of the poles of the contact 668. Relay 660 attracts and breaks contact 661 which causes the dialling tone to cease, switches from 663 to 662, the bias voltage source 615 thereby being disconnected from the ignition electrodes of the gas discharge tubes 620–623, and switches from 664 to 663, the source of bias voltage 615 thereby being connected to the ignition electrodes of the gas discharge tubes 640–643. When the second digit in the designation of the B-subscriber is dialled, the gas discharge tube 640 is energized by the audio frequency impulse which passes the band pass filter 608, which causes the relay 650 and 666 to attract. Relay 650 connects the conductor 455 to one of the poles of contact 668. Relay 666 closes contact 668, whereby the four conductors 452–455, which are connected to the recording heads Ci1–Ci4, are marked with the binary code 1101, where 1 indicates the presence of positive voltage and 0 the absence of voltage. This code is recorded by means of the recording heads Ci1–Ci4 on the strips of the magnetic drum, which in Fig. 8 are called BI. The contact 667 on relay 666 closes circuits for the relays 440 and 501 which attract. This does however not take place before the B-subscriber's binary code having been recorded round the whole periphery of the magnetic drum. When relay 440 attracts, contact 441 is broken, whereby the gas discharge tubes 416 and 426 are extinguished and contact 442 is broken which causes all the gas discharge tubes 620–623 and 640–643 in the register to be extinguished and all the relays in the register to be disconnected. Relay 501 closes a contact 502, which starts the stepping mechanism of the selector 504 which steps until a free channel is found which is indicated by pulses being obtained from the amplifier 509.

When the reproducing heads Ca1–Ca4 start sending pulses corresponding to the code recorded on the strips BI, pulses are obtained on the conductor 373, which goes to the B-subscriber's (i.e. the subscriber No. 13) line gate. These pulses are amplified in the amplifier 222 and transmitted over the transformer 220 to the integrating circuit 217, 218. The voltage over the condenser 218 increases so much that the gas discharge tube 226 fires on the auxiliary gap. This tube is periodically fed with anode current in time to the call signals over a relay 230. Said relay switches the contacts 231, 232 so that the B-subscriber is periodically fed with call signals from the signal generator 204. When the B-subscriber answers, a circuit is closed in the described manner from the battery 221 over the resistances 209, 210 and the subscriber's line 202. The cathode potential on the gas discharge tube 226 is increased so much that the auxiliary gap cannot be ionized and therefore the call signal ceases. The gas discharge tube 225 has its cathode potential reduced by the voltage drop in the resistance 209 and fires, and the gas discharge tube 223 is prevented from firing so that the identifier is prevented from being actuated.

The communication takes place in the manner described in the preceding in connection with the block diagram in Fig. 1.

The connection is controlled in the following manner: As soon as the channel I has been occupied by busy pulses having been recorded by the recording head Di1, the gas discharge tube 514 fires by means of the pulses obtained from the amplifier 510 over the contact bank 505 on the selector 504. Relay 514 attracts and short-circuits the battery 518 which has fed the first control grid in the tube 517 with control voltage. A second grid in said tube is connected on one hand in series with a resistance to a source 519 of grid bias voltage the voltage of which is sufficient to choke the tube, and on the other hand to the common conductor 208. The third grid, finally, is connected to the conductor 460, and is fed with gate pulses from the tooth wheel 318 pertaining to the channel. The amplitude of the unmodulated pulses is determined by the voltage drop over the resistance 209 and is thus considerably higher when the subscriber's circuit is open than when it is closed. The average value of the anode current through the tube 517 is thus depending on whether the subscriber's circuits are closed and it is read by an integrating circuit 521, the output voltage of which is depending on said average value. As long as one or both subscriber's circuits are closed, the tube 522 remains choked.

When the communication is over and both subscriber's circuits have been broken, the disconnection takes place in the following manner: The pulse amplitude from the subscriber and thus the output voltage from the integrating circuits 521 increases so much that the tube 522 becomes energized. Relay 523 attracts, contact 525 is closed and condenser 526 is charged. The voltage on the conductor 458 increases so much that the tubes 409 and 513 are energized, and the codes recorded on the strips AI and BI and the busy signals are erased. At the same time the gas discharge tube 514 is extinguished by the contact 524 being broken. Relay 515 releases, contact 516 is broken and tube 517 is blocked. The tube 522 is blocked again and relay 523 releases. The reproducing head Ca1 starts emitting negative pulses, which are amplified and shaped by the amplifier 509. The channel I is now ready for connecting a new communication as soon as the selector 504 during the searching operation is set to the corresponding position. In the subscriber's equipment the gas discharge tube 225 will at disconnection be extinguished owing to the increase of voltage obtained on the cathode when the subscriber's circuit is broken.

We claim:

1. In an automatic telephone system, in combination, a plurality of numerically designated lines each provided with call initiating and dialling means, individual line gates for selectively connecting said lines to a common point, an amplifier circuit having an input and an output and including, in series connection, amplifying means and delay circuit means, an input gate for selectively connecting the input of said amplifier circuit to said common point, an output gate for selectively connecting the output of said amplifier circuit to said common point, means responsive to the operation of said call initiating and dialling means for individually assigning to each call four fixed time positions which recur in cyclic time position frames containing four times as many time positions as the desired number of simultaneous calls, and for storing the designation of the calling and the called lines of said call and information as to the time positions allotted to said call, pulse generator means for applying in the time positions of a call gating pulses in the first time position of the line gate of the calling line and said input gate, gating pulses in the second time position to the line gate of the called line and said output gate, gating pulses in the third time position to the line gate of the called line and to said input gate and gating pulses in the fourth time position to the line gate of the calling line and said output gate, the time interval between said first and second and between said third and fourth time positions being equal to the delay time of the delay circuit means whereby a sample of a signal produced on the calling line is passed to the input of the amplifier circuit during the first time position and from the output of the amplifier to the called line during the second time position and a sample of a signal produced on the called line is passed to the input of the amplifier during the third time position and from the output of the amplifier circuit to the calling line during the fourth time position.

2. An automatic telephone system as claimed in claim 1, wherein said delay circuit means have a delay time equal to the duration of one time position and the time interval between said first and third time positions is equal to half the recurrence time.

3. An automatic telephone system as claimed in claim 1, wherein said delay circuit means have a delay time equal to half the recurrence time plus the duration of one time position and the time interval between the first and the third pulse positions is equal to half the recurrence time, whereby the said first time position of a call in one frame and the fourth time position of the same call in the next preceding frame follow each other in immediate sequence and the third and the fourth time positions of the same call also follow each other in immediate sequence, the gating pulses of the pulse generator applied to the calling line gate covering both the first time position of one frame and the fourth time position of a preceding frame, and the gating pulses applied to the called line gate covering both said second and said third positions.

References Cited in the file of this patent

UNITED STATES PATENTS

| | | |
|---|---|---|
| 2,490,833 | Ransom | Dec. 13, 1949 |
| 2,679,551 | Newby | May 25, 1954 |
| 2,727,094 | Flowers et al. | Dec. 13, 1955 |
| 2,754,367 | Levy | July 10, 1956 |
| 2,773,934 | Trousdale et al. | Dec. 11, 1956 |